United States Patent
Gomez De Cordova

(10) Patent No.: US 11,389,946 B2
(45) Date of Patent: Jul. 19, 2022

(54) CONTACT PREVENTION MULTI TOOL APPARATUS

(71) Applicant: Freddy Gomez De Cordova, Lakeland, FL (US)

(72) Inventor: Freddy Gomez De Cordova, Lakeland, FL (US)

(*) Notice: Subject to any disclaimer, the term of this patent is extended or adjusted under 35 U.S.C. 154(b) by 27 days.

(21) Appl. No.: 17/030,826

(22) Filed: Sep. 24, 2020

(65) Prior Publication Data
US 2022/0088766 A1   Mar. 24, 2022

(51) Int. Cl.
| | | |
|---|---|---|
| *B25J 1/04* | (2006.01) | |
| *B25J 1/12* | (2006.01) | |
| *B25J 18/02* | (2006.01) | |
| *B25J 15/00* | (2006.01) | |
| *B25B 9/02* | (2006.01) | |

(52) U.S. Cl.
CPC . *B25J 1/12* (2013.01); *B25J 1/04* (2013.01); *B25J 15/0019* (2013.01); *B25J 18/025* (2013.01); *B25B 9/02* (2013.01)

(58) Field of Classification Search
CPC ........ B25J 1/02; B25J 1/04; B25J 1/12; A47F 13/06; B63B 21/54
USPC ................... 294/209, 210, 24, 191
See application file for complete search history.

(56) References Cited

U.S. PATENT DOCUMENTS

| | | | | |
|---|---|---|---|---|
| 1,509,157 A | * | 9/1924 | Leano | A45B 3/04 135/66 |
| 3,072,428 A | * | 1/1963 | Johnson | B63B 21/54 294/2 |
| 5,003,437 A | * | 3/1991 | Barrett | F21V 33/008 114/221 R |
| 5,582,196 A | * | 12/1996 | Hae | A45B 3/00 135/65 |
| 5,640,985 A | * | 6/1997 | Snyder | A45B 3/00 135/65 |
| 6,293,601 B1 | | 9/2001 | Johnson | |
| 6,502,587 B1 | | 1/2003 | Kellum | |
| 7,178,845 B1 | * | 2/2007 | Metzger | E05B 1/0053 294/169 |
| 7,490,880 B1 | | 2/2009 | Matsui | |
| 7,938,464 B1 | | 5/2011 | Hielm | |
| 10,034,522 B1 | | 7/2018 | Anglade | |
| 10,036,415 B2 | | 7/2018 | Yitzhaki | |
| 10,625,413 B1 | * | 4/2020 | McPherson | B25J 15/024 |
| 2004/0100109 A1 | | 5/2004 | Johnson | |
| 2007/0018467 A1 | * | 1/2007 | Schwartz | A47F 13/06 294/210 |
| 2014/0054912 A1 | * | 2/2014 | Bustos | B25B 9/00 294/190 |

(Continued)

*Primary Examiner* — Dean J Kramer

(57) ABSTRACT

A contact prevention multi tool apparatus for allowing manipulation of various object types without direct contact includes a handle having a handle proximal end and a handle distal end. A has a housing proximal side coupled to the handle distal end. The housing defines a main storage compartment and has a main storage aperture extending through a housing left side to the main storage compartment. A main door is coupled to the housing. The main door is slidably engaged with the housing to selectively cover or expose the main storage compartment. An arm is coupled to the housing. The arm is coupled to a housing distal side of the housing. A spherical touch head is coupled to an arm distal end of the arm. A hook is coupled to the arm adjacent the touch head.

12 Claims, 5 Drawing Sheets

(56) References Cited

U.S. PATENT DOCUMENTS

2016/0008502 A1   1/2016  LaBonte
2019/0029405 A1*  1/2019  Kolb ........................ F16B 45/00
2020/0086477 A1*  3/2020  Fulkerson .................. B25J 1/04
2021/0321796 A1*  10/2021  Fitzgerald ............... A47F 13/06

* cited by examiner

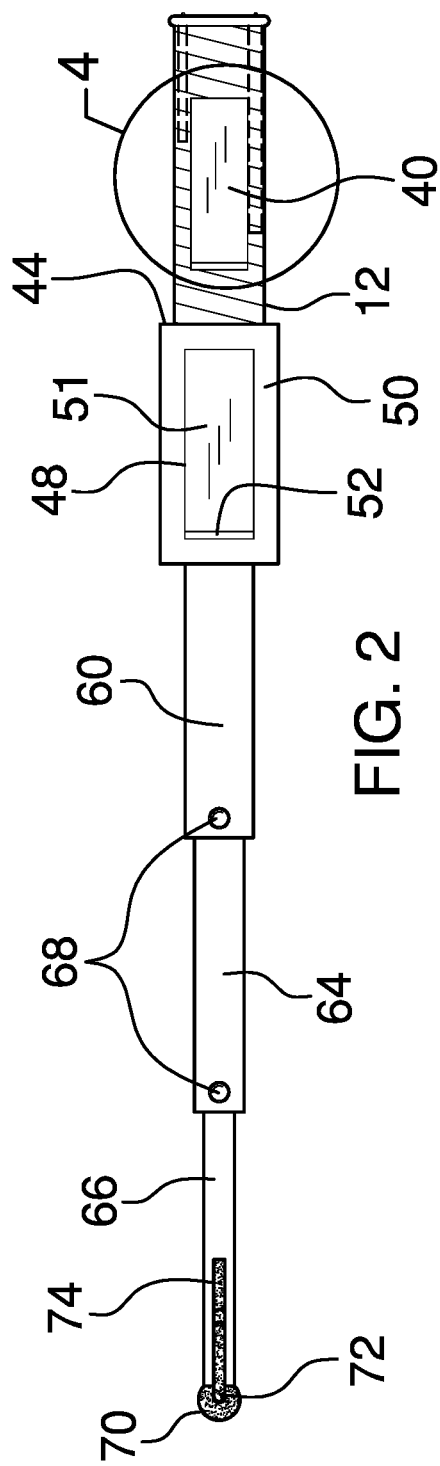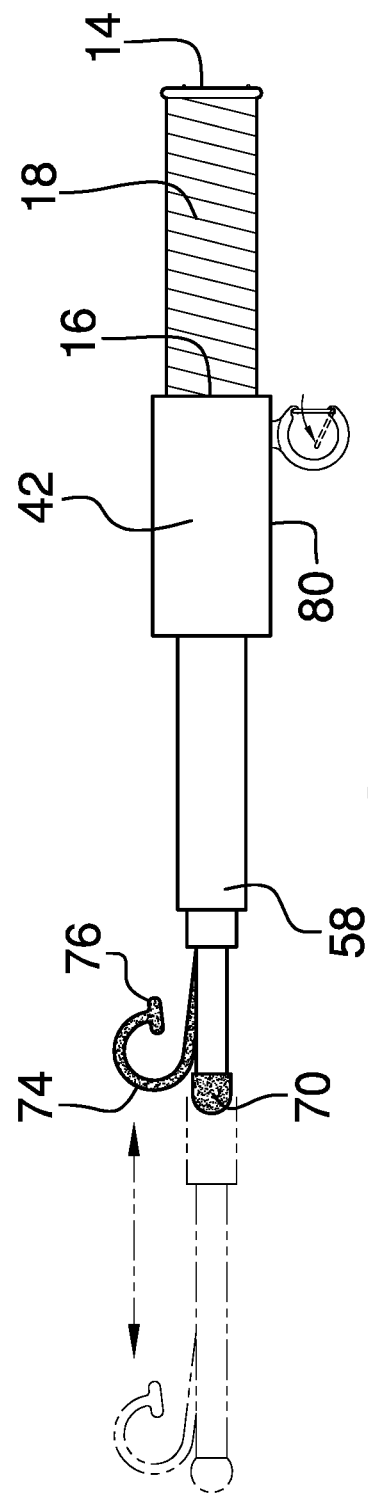

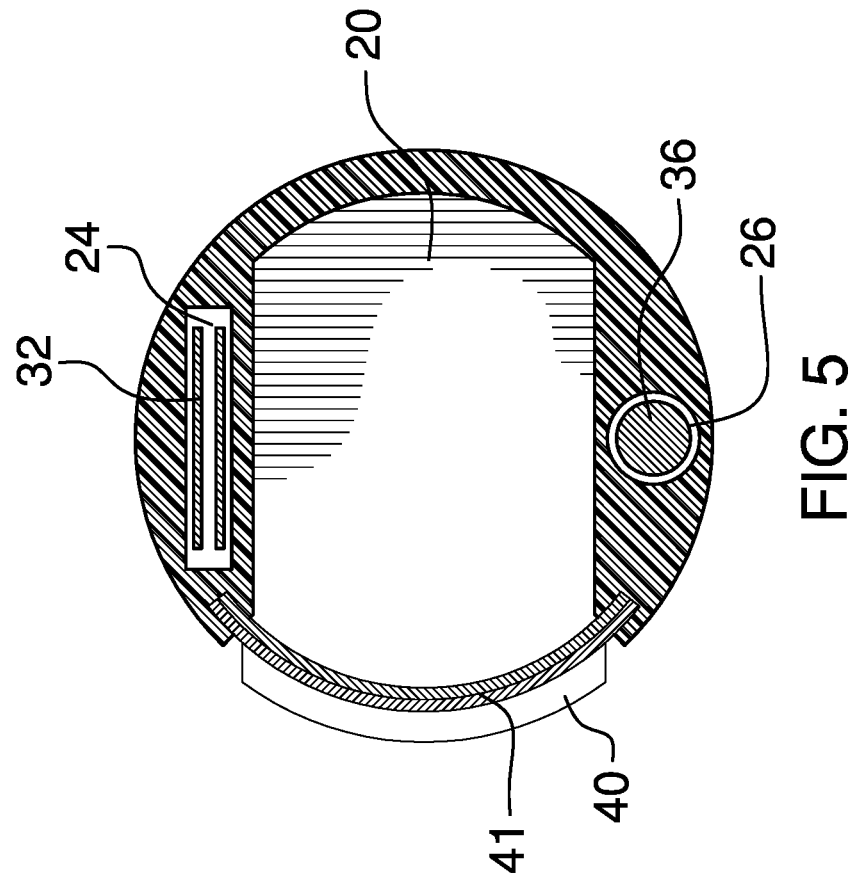
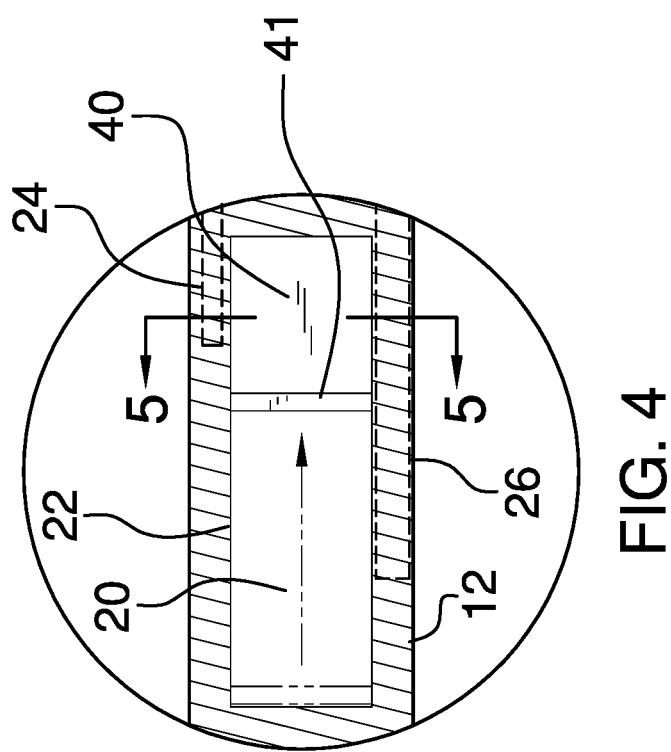
FIG. 5
FIG. 4

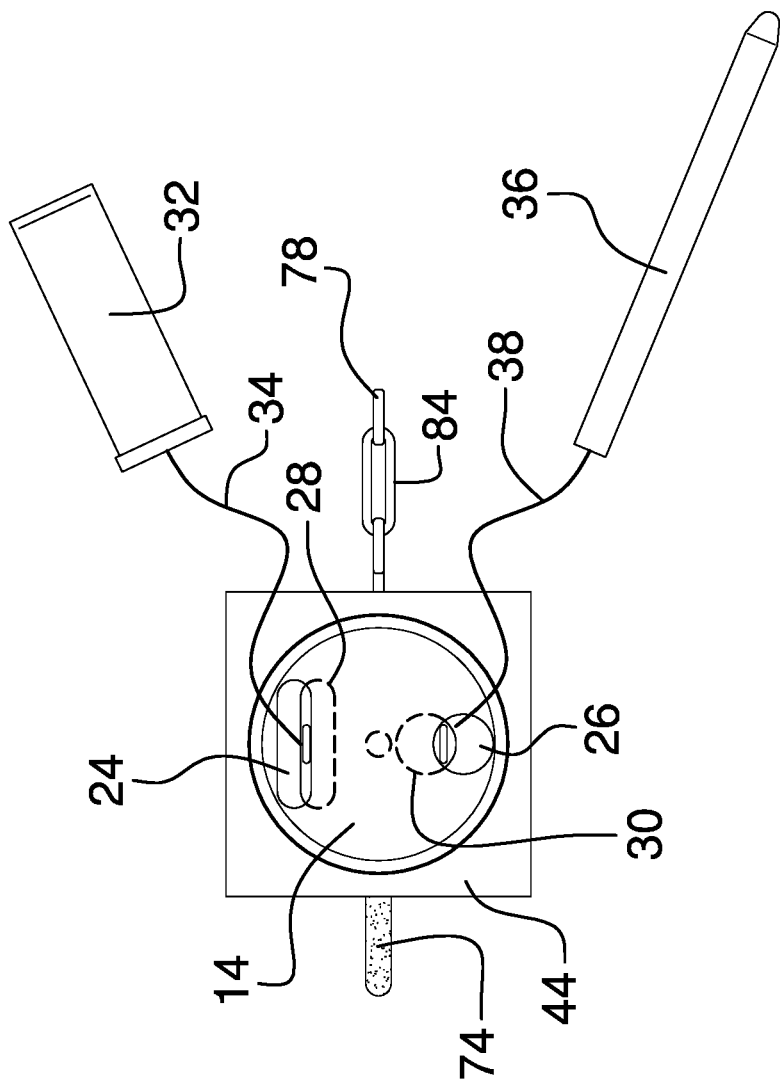

CONTACT PREVENTION MULTI TOOL APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to contact prevention tool devices and more particularly pertains to a new contact prevention tool device for allowing manipulation of various object types without direct contact.

(2) Description of Related Art Including Information Disclosed Under 37 CFR 1.97 and 1.98

The prior art relates to contact prevention tool devices. Existing devices typically include only one usable contact point, be it a hook, a stylus, a poker, or a grabber. These devices fail to incorporate a variety of different ways of interacting with devices, requiring users to either carry multiple devices or to engage in direct contact with objects at the risk of their hygiene. Known devices also lack storage compartments to hold other objects and sanitary tools.

BRIEF SUMMARY OF THE INVENTION

An embodiment of the disclosure meets the needs presented above by generally comprising a handle having a handle proximal end and a handle distal end. A housing is coupled to the handle. The housing has a housing proximal side coupled to the handle distal end. The housing defines a main storage compartment and has a main storage aperture extending through a housing left side to the main storage compartment. A main door is coupled to the housing. The main door is slidably engaged with the housing to selectively cover or expose the main storage compartment. An arm is coupled to the housing. The arm is coupled to a housing distal side of the housing. A spherical touch head is coupled to the arm. The touch head is coupled to an arm distal end of the arm. A hook is coupled to the arm. The hook is coupled adjacent the touch head.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a side elevation view of an embodiment of the disclosure.

FIG. 3 is a bottom plan view of an embodiment of the disclosure.

FIG. 4 is a detail view of an embodiment of the disclosure.

FIG. 5 is a cross-sectional view of an embodiment of the disclosure along the line 5-5 of FIG. 4.

FIG. 8 is a detail view of an embodiment of the disclosure.

DETAILED DESCRIPTION OF THE INVENTION

Figure 1:
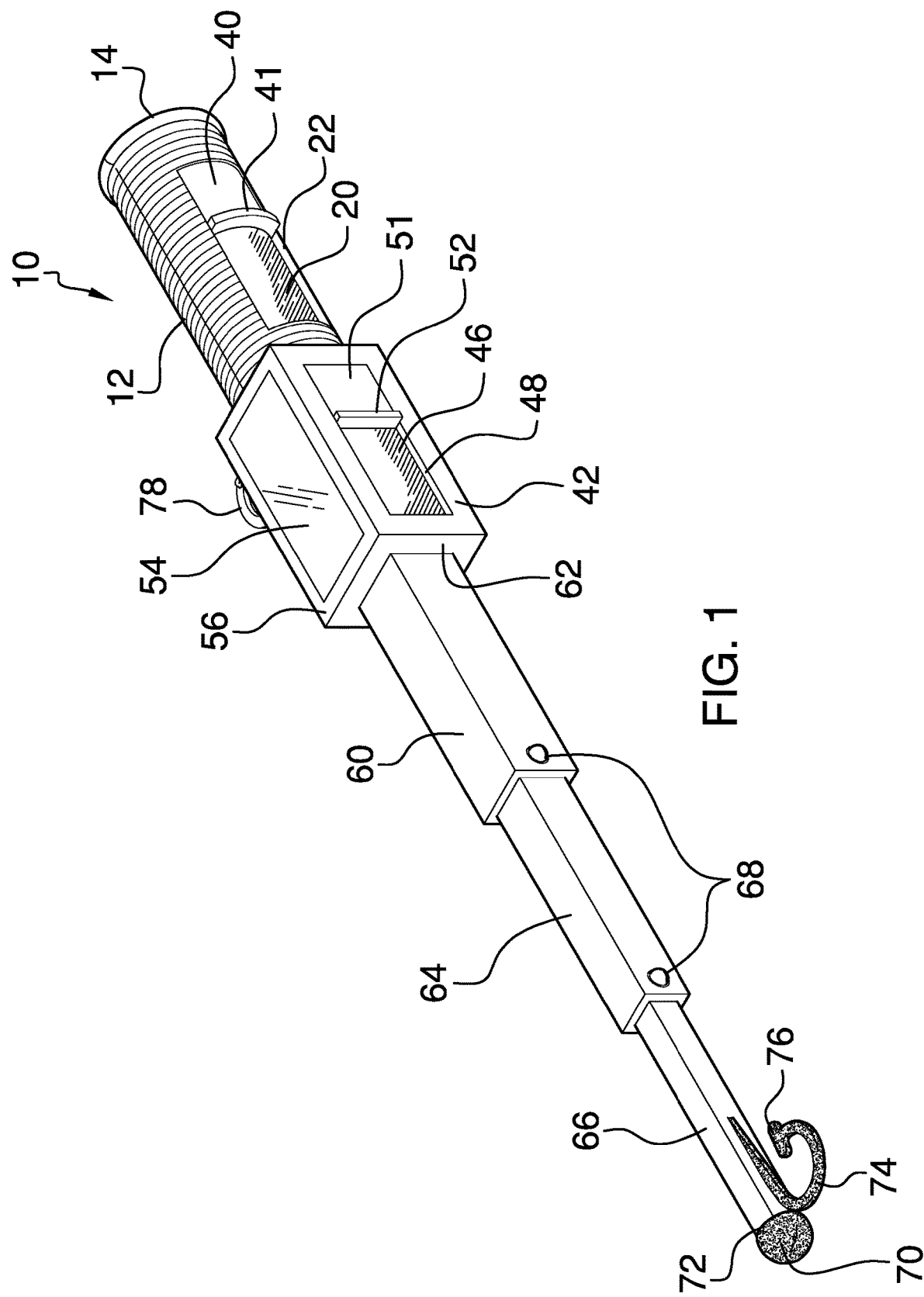
FIG. 1 is an isometric view of a contact prevention multi tool apparatus according to an embodiment of the disclosure.
Figure 6:
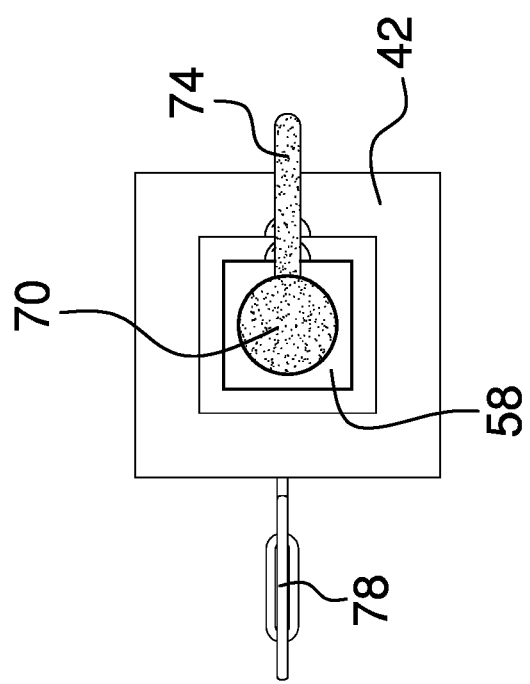
FIG. 6 is a front elevation view of an embodiment of the disclosure.
Figure 7:
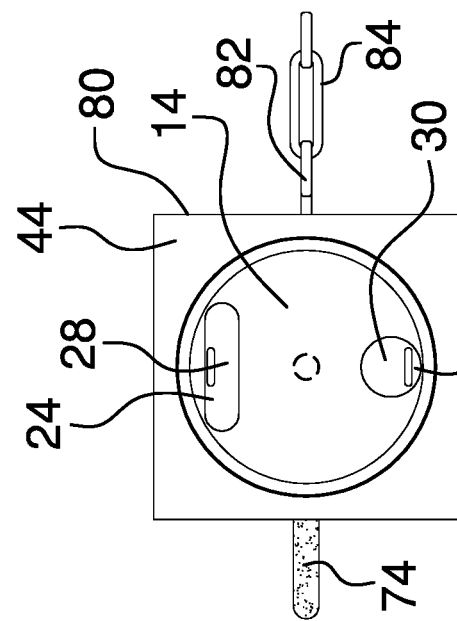
FIG. 7 is a rear elevation view of an embodiment of the disclosure.

With reference now to the drawings, and in particular to FIGS. 1 through 8 thereof, a new contact prevention tool device embodying the principles and concepts of an embodiment of the disclosure and generally designated by the reference numeral 10 will be described.

As best illustrated in FIGS. 1 through 8, the contact prevention multi tool apparatus 10 generally comprises a handle 12 having a handle proximal end 14, a handle distal end 16, and a cylindrical handle sidewall 18. The handle 12 may define a handle compartment 20 with a handle compartment aperture 22 extending through the handle sidewall 18 to the handle compartment 20. The handle proximal end 14 of the handle may have a tweezer cavity 24 and a stylus cavity 26. The tweezer cavity 24 may have a tweezer door 28 and the stylus cavity 26 may have a stylus door 30. A tweezer 32 is coupled within the tweezer cavity 24 and may have a tweezer tether 34 coupled within the tweezer cavity 24 to prevent complete separation from the handle 12. A stylus 36 is coupled within the stylus cavity 26 and may have a stylus tether 38 coupled within the stylus cavity 26 to prevent complete separation from the handle 12. A handle door 40 is coupled to the handle 12. The handle door 40 may be slidably engageable within the handle 12 to selectively cover or expose the handle compartment 20. The handle door 40 may have a handle door lip 41.

A housing 42 is coupled to the handle 12. The housing 42 has a housing proximal side 44 coupled to the handle distal end 16. The housing 42 may be rectangular prismatic and defines a main storage compartment 46. The housing 42 has a main storage aperture 48 extending through a housing left side 50 to the main storage compartment 46. A main door 51 is coupled to the housing 42. The main door 51 is slidably engaged with the housing 42 to selectively cover or expose the main storage compartment 46. The main door 51 may have a main door lip 52. A mirror 54 may be coupled to a housing top side 56 of the housing.

An arm 58 is coupled to the housing 42. The arm 58 may be telescopable and comprises a fixed arm portion 60 coupled to a housing distal side 62 of the housing, a medial arm portion 64 slidingly coupled within the fixed arm portion 60, and a distal arm portion 66 slidingly coupled within the medial arm portion 64. Each of the fixed arm portion 60 and the medial arm portion 64 may have a ball spring 68 to allow the arm 58 to telescope when depressed. Each of the fixed arm portion 60, the medial arm portion 64, and the distal arm portion 66 may be square tubing.

A spherical touch head 70 is coupled to the arm 58. The touch head 70 is coupled to an arm distal end 72 of the arm to use as a poker, such as when depressing a button of an elevator. A hook 74 is coupled to the arm 58. The hook 74 is coupled adjacent the touch head 70. The hook 74 may have a perpendicular tip portion 76 oriented parallel to the arm 58. The tip portion 76 may be obround to prevent snagging on material. The hook 74 may be used to grab objects such as a door handle. Each of the touch head 70 and the hook 74 may be coated in a rubberized, anti-bacterial material for improved grip and sanitary effect.

A clip 78 may be coupled to the housing 42. The clip 78 is coupled to a housing right side 80 of the housing and includes a semi-cylindrical body portion 82 and a spring-hinged gate portion 84. The clip 78 is configured to secure the apparatus 10 to a belt, a bag strap, or any other object.

In use, the user may select the tweezer 32, the stylus 36, the touch head 70, or the hook 74 to perform a task without having to make direct contact with an object in order to prevent the spread of bacteria, viruses, and germs.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A contact prevention multi tool apparatus comprising:
   a handle, the handle having a handle proximal end and a handle distal end;
   a housing coupled to the handle, the housing having a housing proximal side coupled to the handle distal end, the housing defining a main storage compartment and having a main storage aperture extending through a housing left side to the main storage compartment;
   a main door coupled to the housing, the main door being slidably engaged with the housing to selectively cover or expose the main storage compartment;
   an arm coupled to the housing, the arm being coupled to a housing distal side of the housing;
   a spherical touch head coupled to the arm, the touch head being coupled to an arm distal end of the arm;
   a hook coupled to the arm, the hook being coupled adjacent the touch head; and
   a mirror coupled to a housing top side of the housing.

2. The contact prevention multi tool apparatus of claim 1 further comprising the arm being telescopable.

3. The contact prevention multi tool apparatus of claim 2 further comprising the arm comprising a fixed arm portion coupled to the housing, a medial arm portion slidingly coupled within the fixed arm portion, and a distal arm portion slidingly coupled within the medial arm portion.

4. The contact prevention multi tool apparatus of claim 3 further comprising each of the fixed arm portion and the medial arm portion having a ball spring to allow the arm to telescope.

5. The contact prevention multi tool apparatus of claim 1 further comprising the hook having a perpendicular tip portion oriented parallel to the arm.

6. A contact prevention multi tool apparatus comprising:
   a handle, the handle having a handle proximal end and a handle distal end;
   a housing coupled to the handle, the housing having a housing proximal side coupled to the handle distal end, the housing defining a main storage compartment and having a main storage aperture extending through a housing left side to the main storage compartment;
   a main door coupled to the housing, the main door being slidably engaged with the housing to selectively cover or expose the main storage compartment;
   an arm coupled to the housing, the arm being coupled to a housing distal side of the housing;
   a spherical touch head coupled to the arm, the touch head being coupled to an arm distal end of the arm; and
   a hook coupled to the arm, the hook being coupled adjacent the touch head, the hook having a perpendicular tip portion oriented parallel to the arm, the tip portion being obround.

7. A contact prevention multi tool apparatus comprising:
   a handle, the handle having a handle proximal end and a handle distal end;
   a housing coupled to the handle, the housing having a housing proximal side coupled to the handle distal end, the housing defining a main storage compartment and having a main storage aperture extending through a housing left side to the main storage compartment;
   a main door coupled to the housing, the main door being slidably engaged with the housing to selectively cover or expose the main storage compartment;
   an arm coupled to the housing, the arm being coupled to a housing distal side of the housing;
   a spherical touch head coupled to the arm, the touch head being coupled to an arm distal end of the arm;
   a hook coupled to the arm, the hook being coupled adjacent the touch head; and
   a clip coupled to the housing, the clip being coupled to a housing right side of the housing and including a semi-cylindrical body portion and a spring-hinged gate portion, the clip being configured to secure the apparatus to a belt, a bag strap, or any other object.

8. A contact prevention multi tool apparatus comprising:
   a handle, the handle having a handle proximal end and a handle distal end;
   a housing coupled to the handle, the housing having a housing proximal side coupled to the handle distal end, the housing defining a main storage compartment and having a main storage aperture extending through a housing left side to the main storage compartment;

a main door coupled to the housing, the main door being slidably engaged with the housing to selectively cover or expose the main storage compartment;

an arm coupled to the housing, the arm being coupled to a housing distal side of the housing;

a spherical touch head coupled to the arm, the touch head being coupled to an arm distal end of the arm;

a hook coupled to the arm, the hook being coupled adjacent the touch head; and the handle defining a handle compartment; a handle door coupled to the handle, the handle door being slidably engageable within the handle to selectively cover or expose the handle compartment.

9. A contact prevention multi tool apparatus comprising:

a handle, the handle having a handle proximal end and a handle distal end;

a housing coupled to the handle, the housing having a housing proximal side coupled to the handle distal end, the housing defining a main storage compartment and having a main storage aperture extending through a housing left side to the main storage compartment;

a main door coupled to the housing, the main door being slidably engaged with the housing to selectively cover or expose the main storage compartment;

an arm coupled to the housing, the arm being coupled to a housing distal side of the housing;

a spherical touch head coupled to the arm, the touch head being coupled to an arm distal end of the arm;

a hook coupled to the arm, the hook being coupled adjacent the touch head; and the handle proximal end of the handle having a tweezer cavity and a stylus cavity; a tweezer coupled within the tweezer cavity; and a stylus coupled within the stylus cavity.

10. The contact prevention multi tool apparatus of claim 9 further comprising the stylus having a stylus tether coupled within the stylus cavity; and the tweezer having a tweezer tether coupled within the tweezer cavity.

11. The contact prevention multi tool apparatus of claim 9 further comprising the tweezer cavity having a tweezer door and the stylus cavity having a stylus door.

12. A contact prevention multi tool apparatus comprising:

a handle, the handle having a handle proximal end and a handle distal end, the handle defining a handle compartment, the handle proximal end of the handle having a tweezer cavity and a stylus cavity, the tweezer cavity having a tweezer door, the stylus cavity having a stylus door;

a tweezer coupled within the tweezer cavity, the tweezer having a tweezer tether coupled within the tweezer cavity;

a stylus coupled within the stylus cavity, the stylus having a stylus tether coupled within the stylus cavity;

a handle door coupled to the handle, the handle door being slidably engageable within the handle to selectively cover or expose the handle compartment;

a housing coupled to the handle, the housing having a housing proximal side coupled to the handle distal end, the housing defining a main storage compartment and having a main storage aperture extending through a housing left side to the main storage compartment;

a main door coupled to the housing, the main door being slidably engaged with the housing to selectively cover or expose the main storage compartment;

a mirror coupled to a housing top side of the housing;

an arm coupled to the housing, the arm being telescopable and comprising a fixed arm portion coupled to a housing distal side of the housing, a medial arm portion slidingly coupled within the fixed arm portion, and a distal arm portion slidingly coupled within the medial arm portion, each of the fixed arm portion and the medial arm portion having a ball spring to allow the arm to telescope;

a spherical touch head coupled to the arm, the touch head being coupled to an arm distal end of the arm;

a hook coupled to the arm, the hook being coupled adjacent the touch head, the hook having a perpendicular tip portion oriented parallel to the arm, the tip portion being obround; and a clip coupled to the housing, the clip being coupled to a housing right side of the housing and including a semi-cylindrical body portion and a spring-hinged gate portion, the clip being configured to secure the apparatus to a belt, a bag strap, or any other object.

* * * * *